United States Patent
Cherian et al.

(10) Patent No.: US 6,260,113 B1
(45) Date of Patent: Jul. 10, 2001

(54) METHOD AND APPARATUS DEFINING A MISS LIST AND PRODUCING DIAL-IN HIT RATIOS IN A DISK STORAGE BENCHMARK

(75) Inventors: Neena Annie Cherian, San Jose; Bruce McNutt, Gilroy, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/190,923

(22) Filed: Nov. 12, 1998

(51) Int. Cl.$^7$ .............................. G06F 12/00; G06F 11/34
(52) U.S. Cl. ........................ 711/118; 711/133; 711/137; 711/113; 714/718; 702/186
(58) Field of Search ........................... 711/118, 130, 711/133, 137, 159, 112, 113; 714/718, 728, 730, 739, 743; 703/14, 21, 22; 702/186, 182

(56) References Cited

U.S. PATENT DOCUMENTS

| | | | |
|---|---|---|---|
| 4,680,703 | 7/1987 | Kriz | 711/112 |
| 4,965,799 | 10/1990 | Green et al. | 714/719 |
| 5,018,060 | 5/1991 | Gelb et al. | 707/205 |
| 5,191,568 | 3/1993 | Muto et al. | 369/32 |
| 5,408,634 | 4/1995 | Joho | 710/52 |
| 5,491,810 | 2/1996 | Allen | 711/117 |
| 5,584,012 | 12/1996 | Kojima et al. | 711/122 |
| 5,625,800 | 4/1997 | Brayton et al. | 711/217 |
| 5,638,381 | 6/1997 | Cho et al. | 714/732 |
| 5,745,737 | * 4/1998 | Kayes et al. | 703/13 |
| 5,809,523 | * 9/1998 | Kayes et al. | 711/118 |
| 5,930,497 | * 7/1999 | Cherian et al. | 703/21 |
| 5,953,689 | * 9/1999 | Hale et al. | 702/186 |

* cited by examiner

*Primary Examiner*—Glenn Gossage
(74) *Attorney, Agent, or Firm*—Altera Law Group, LLC

(57) ABSTRACT

A method and apparatus for defining a random miss list and producing a desired hit ratio in a benchmark test of computer disk storage are disclosed. The disk area to be tested is divided into N tracks. A random miss list of L tracks is defined as specified by the invention. The tracks in the miss list are subdivided into groups, with each group having G tracks. Each one of a plurality of concurrent processes is assigned a different group of G tracks from the miss list. A pointer for each process is initialized to point to the first track in the corresponding group of G tracks. A plurality of input/output (I/O) operations are performed for each process, with each I/O operation being performed on the track pointed to by the pointer for the corresponding process. For each process, prior to each I/O operation that is performed after the first I/O operation, a random decision is made whether or not to increment the pointer belonging to the process. The probability of incrementing the pointer is equal to a desired miss ratio. By choosing the probability, the user can select any desired hit ratio. The addresses of the tracks in the miss list are more random, resulting in better, more reliable benchmark test results.

21 Claims, 4 Drawing Sheets

METHOD AND APPARATUS DEFINING A MISS LIST AND PRODUCING DIAL-IN HIT RATIOS IN A DISK STORAGE BENCHMARK

BACKGROUND OF THE INVENTION

1. Field of the Invention

The invention relates to benchmark tests of computer storage disks. More particularly, the invention concerns defining a random miss list, and producing a desired hit ratio in a benchmark test using the miss list.

2. Description of the Related Art

Benchmark performance tests are frequently used to evaluate the performance of computer disk storage products such as, for example, disk drives. Generally, benchmark tests are used to test response time, which is how quickly input/output (I/O) completion occurs when reading or writing, and throughput, which is the number of I/O operations that a drive can process per second. In order to reflect data base accesses in a credible way with these benchmarks, multiple processes must generate I/O concurrently to a shared set of files on the system.

One or more disks and a cache, which is a high speed memory associated with the disk(s), together make up a disk storage system. A hit occurs when the data that is the object of an I/O operation is present in the cache. Conversely, a miss occurs when the data that is the object of an I/O operation is not present in the cache. The hit ratio is the number of hits divided by the total number of I/O operations. Similarly, the miss ratio is the number of misses divided by the total number of I/O operations. Typically, a range of hit ratios must be tested, often including specific anticipated hit-ratios. The I/O operations are typically reads and writes. Because the sum of the hit ratio and the miss ratio equals one, the hit ratio can be determined if the miss ratio is known, and the miss ratio can be determined if the hit ratio is known. A dial-in hit ratio is a hit ratio that can be specified by the user. When data that is the object of an I/O operation is not present in the cache (a miss), typically the data will be loaded into the cache, which is referred to as a stage operation. Commonly, a track of data is loaded in the cache as the result of a stage operation.

A prior art method for producing a desired hit ratio in a benchmark test is illustrated by the tasks 100 of the flowchart in FIGS. 1A and 1B. This method has a dial-in hit ratio. In task 105, the disk area to be tested is divided into N tracks. The disk area to be tested can include one or more entire disk drives and/or portions of one or more disk drives. Preferably, the disk area to be tested is one or more entire disk drive(s). Typically, the disk area to be tested will be drive(s) of a computer on which the benchmark test is run. Preferably, the disk drive is a magnetic disk drive (commonly referred to as a "hard drive"). Alternatively, this method could be used to test other data storage media, for example, optical data storage disks, or magneto-optical data storage disks. This method for producing a desired hit ratio in a benchmark can generally be run on any type of computer system having sufficient computing power to drive the particular I/O system being used.

A track is defined as the largest unit of transfer from disk to cache. Tracks are defined such that a request for data on one track does not enable a hit to occur on any other track. The exact definition of a track is flexible, and need not be related to physical tracks. For example, some or all of the tracks can be logical tracks rather than physical tracks.

Cache misses are obtained or produced as needed by making requests to the tracks identified in a miss list. A single miss list can be used to obtain cache misses for successive benchmark tests, which can also be referred to as experiments. In order to be able to produce misses with a desired frequency, a list of tracks for the miss list is defined (which can also be referred to as being generated). The miss list is defined implicitly, without requiring an array or other memory structure to enumerate the elements of the list. The tracks in the miss list are used for the I/O operations in the benchmark test(s). The miss list consists of L of the available tracks organized in a pseudo-random order. In task 110 in FIG. 1, a miss list of L tracks is defined, with $L \leq N$, wherein N represents a number of tracks the disk area to be tested is divided into and with L being larger than the largest number of track images that can be stored in disk cache, which is designated S. L must be larger than the largest number of track images that can be stored in disk cache in order to ensure that elements of the miss list will be cycled out of the cache before possibly being used again, to ensure that a miss will occur if an element is used again. Randomness of the addresses of the tracks chosen for the miss list is desirable because it enhances the reliability of the results of the benchmark test because it spreads the misses randomly throughout the disk area being tested.

A miss will occur the first time a track on the miss list is accessed in an I/O operation. A hit will occur subsequent times that a track on the miss list is accessed in an I/O operation, unless the track is used again after cycling through the entire miss list, or after cycling through enough of the miss list to cause that track to be cycled out of the cache. Thus, the user can select the hit ratio by specifying the probability that a new track on the miss list will be used for an I/O operation.

As shown in task 115, prior to conducting the first I/O operation of the first benchmark test to be run with a particular miss list, it must be ensured that the cache corresponding with the disk area to be tested does not contain the address of any of the tracks in or on the miss list. This prevents the occurrence of inadvertent hits, and is accomplished by clearing the contents of the cache, or by writing into the cache any data pattern that does not load the addresses of any of the tracks in the miss list in any of the address fields of the cache. If necessary, the cache can be powered down to clear the contents of the cache. When using a single miss list for more than one benchmark test, it is not necessary to clear the cache between benchmark tests or to write a data pattern described above into the cache between benchmark tests, even if different hit ratios are used in the benchmark tests.

The tracks in the miss list are referred to as m(i), for i=0, 1, . . . L−1. In task 120, the tracks in the miss list are subdivided into groups, with each group having G tracks. G is chosen such that:

$$\text{(safety factor one)(maximum misses in any single benchmark run)} \leq GP \leq L; \quad (1)$$

where P is the number of concurrent processes. Safety factor one is included to ensure that no process generates more than G misses in a single experiment. In the prior art, it is known to use a value of 1.5 for safety factor one. The maximum misses in any single benchmark run is estimated as:

(test interval)(physical disks)(miss ratio)/(fastest disk service time);

where the test interval is the period of time of running the benchmark for collecting data, and where the fastest disk service time is the shortest possible time in which data can be retrieved from the disk.

In task 125, a different group of G tracks from the miss list is assigned to each one of a plurality of concurrent processes. For example, in the first benchmark test (also referred to as an experiment), process zero is assigned the tracks:

$$m(i), i=0,1, \ldots, G-1;$$

and process one is assigned the tracks:

$$m(i), i=G, G+1, \ldots, 2G-1.$$

This pattern continues until the final process is assigned the tracks:

$$m(i), i=(P-1)G, (P-1)G+1, \ldots, ((P-1)G+G-1=PG-1).$$

Assignment of tracks in subsequent experiments continues where the previous assignments leave off, until all of the elements of the miss list have been exhausted. The pattern of assignments then continues by rotating back to the beginning of the miss list. For example, if i=PG=L-1 represents the last element of the list, then in the second experiment of the example above the tracks assigned to process zero would be:

$$m(i), i=PG, 0, 1, \ldots G-2.$$

Thus, each combination of a specific process running in a specific benchmark experiment is assigned one group of G tracks from the miss list.

If desired, the number of concurrent processes can be changed between benchmark runs. Either or both of the quantities P and G can be changed, and such a change need not be planned in advance (the new values can be based upon information gathered in previous runs). However, the new values of P and G must continue to satisfy equation (1) above.

In task 130, a pointer for each process is initialized. The pointer for each process is initialized to point to the first track in the corresponding group of G tracks. The value of i for each group of G tracks assigned to a process acts as the pointer for that group of tracks.

The method of FIG. 1A continues at circle B in FIG. 1B. At this point the benchmark test is commenced by starting the running of all of the processes. Each process then independently cycles through tasks 135, 140, and 145. In task 135, an I/O operation is performed. The I/O operation is performed on the track pointed to by the pointer for the process. After a process completes task 135, in task 140 it is decided whether to cause the process to perform an additional I/O operation. For each process, it will always be decided to perform an additional I/O operation, until the end of the test interval is reached, after which no additional I/O operations will be performed by any processes. Thus, a plurality of I/O operations are performed for each process. Each I/O operation is performed on the track m(i) pointed to by the pointer for the process at the time of the I/O operation. If in task 140 it is decided to perform an additional I/O operation, then task 145 is performed. If the end of the test interval has been reached, then in task 140 it will be decided not to perform an additional I/O operation, and task 150 will then be performed.

In task 145, a random choice is made whether to change the position of the pointer within the group of G tracks corresponding with the process. The position of a pointer is changed by incrementing the pointer. This choice is made, and the pointer is incremented or not incremented as a result of the choice, prior to each I/O operation after the first I/O operation for the process. The probability of incrementing the pointer is set equal to the desired miss ratio. To increment a pointer, if i currently points to the last element of the miss list, then i is incremented by resetting it to zero, otherwise, i is incremented by adding one to its current value.

Each I/O operation may also be referred to as an I/O request. For each process, a request will be a cache miss if and only if the position of the pointer was changed after the immediately preceding I/O request for that process. This ensures that the process generates an I/O pattern with the specified hit ratio. The I/O operations can be all reads, all writes, or any combination of reads and writes. Thus, this method can be used to control the hit ratios for reads and/or writes. When using writes, it is assumed that a write miss causes a stage (a write to cache of the missed track).

For each process, after task 145 is completed, tasks 135 and 140 are performed again. If, in task 140, it is decided not to perform an additional I/O operation, then task 150 is performed.

In task 150, it is decided whether to perform an additional experiment (also referred to as an additional test). If it is decided to perform an additional experiment, then the method is continued at circle A in FIG. 1A, otherwise the method is ended.

The desired miss ratio for the first experiment may also be referred to as a first desired miss ratio, and, if a second experiment is performed, the desired miss ratio for the second experiment is referred to as a second desired miss ratio. In the second experiment, initializing a pointer for each process is referred to as reinitializing a pointer for each process, even if a new process or new processes are used in the second experiment. Performing one or more additional experiments permits dividing device tests into a succession of individual benchmark experiments, (also referred to as runs) in order to test disk performance at various specific hit ratios. It is not necessary to define a new miss list when changing hit ratios. Thus, one or more benchmark tests, having the same or different hit ratios, may be conducted using a single miss list.

A method known in the prior art for defining a miss list is shown by the tasks 200 of the flowchart in FIG. 2. In task 205, L is set equal to N, wherein L is the number of tracks in the miss list and N represents a number of tracks the disk area to be tested is divided into. In task 210, a variable j is set equal to [cL], where the square brackets represent the greatest integer function (which can also be described as taking the integer part of the value). c is an empirically determined constant, with 0<c <1. The value of c is chosen to maximize the randomness of the resulting track selection. c=367/1361 is a preferred value of c.

After j is calculated, a variable k (for k=j, j+1, . . . ) is tested to determine whether k is relatively prime to L. For the first such k (the smallest such k), a variable D is set equal to k. These tasks are summarized in task 215. As shown in task 220, after D is ascertained, the tracks m(i) of the miss list (for integers i, for 0<i<L) are calculated as follows: m(i)=iD(mod L).

Despite the usefulness of the method described above, better, more reliable results could be produced if a more random miss list could be generated, because greater randomness in the addresses of the tracks in the miss list would result in misses being spread more randomly throughout the disk area being tested. Accordingly, there is a need for a method for producing a more random miss list for use in a benchmark test.

SUMMARY OF THE INVENTION

Broadly, the invention concerns defining a random miss list, and producing a desired hit ratio in a benchmark test using the miss list, for testing computer disk storage.

In an illustrative embodiment of the invention, the disk area to be tested is divided into N tracks. A miss list of L tracks is defined. The miss list is a list of tracks that are used to cause cache misses when an I/O operation is performed. The tracks in the miss list are subdivided into groups, with each group having G tracks. Each one of a plurality of concurrent processes is assigned a different group of G tracks from the miss list. A pointer for each process is initialized to point to a track in the corresponding group of G tracks. A plurality of I/O operations are performed for each process, with each I/O operation being performed on the track pointed to by the pointer for the corresponding process. The I/O operations can be reads, writes, or any combination of reads and writes. For each process, prior to each I/O that is performed after the first I/O, a random decision is made whether to increment the pointer belonging to the process. The probability of incrementing the pointer is equal to the desired miss ratio.

In order to define the miss list, L is set equal to the largest prime integer that is less than or equal to N, and that is larger than the largest number of track images that can be stored in disk cache (designated S). Next, a random integer a (for $2 \leq a < L$) that is a primitive root of L is found. Then, the tracks m(i) of the miss list are determined by calculating $m(i)=a^i(\mod L)$, (for integers i, for $0 \leq i < L$), where "mod" indicates the use of modular arithmetic. In modular arithmetic, only the remainder is retained after subtracting out multiples of L. The variable i represents the position of track m(i) in the miss list, and functions as the pointer for each process. The value of i for each process lies in a range selected for that process.

The invention can be implemented in several embodiments, including as a method, a signal bearing medium, and an apparatus.

The invention affords its users with the advantage of providing more reliable benchmark test results by producing a miss list in which the addresses of the tracks of the miss list have greater randomness than prior art methods for producing a miss list.

The invention also provides other advantages and benefits, which are apparent from the following description.

DETAILED DESCRIPTION OF THE PREFERRED EMBODIMENTS

The nature, objects, and advantages of the invention will become more apparent to those skilled in the art after considering the following detailed description in connection with the accompanying drawings. As discussed above, the invention concerns defining a random miss list, and producing a desired hit ratio in a benchmark test using the miss list, for testing computer disk storage.

Method

One aspect of the invention concerns a method for defining a random miss list, and also concerns a method for producing a desired hit ratio in a benchmark test using the miss list, for testing computer disk storage. Although the miss list produced by the method of the invention for defining a random miss list is preferably used in the method of the invention for producing a desired hit ratio in a benchmark test, the miss list could also be used in benchmark tests that do not have a selectable hit ratio. In the method of the invention for defining a random miss list and producing a desired hit ratio in a benchmark test, a desired hit ratio is produced in a benchmark test according to the method described in the background section, except that the miss list is defined according to the method of the invention for defining a miss list rather than according to the method for defining a miss list described in the background section, and except as otherwise noted herein.

As with the method described in the background section, the disk area to be tested using the method of the invention for defining a random miss list and producing a desired hit ratio in a benchmark test, can include one or more entire disk drives and/or portions of one or more disk drives. Preferably, the disk area to be tested is one or more entire disk drive(s). Typically, the disk area to be tested will be drive(s) of a computer on which the benchmark test is run. Preferably, the disk drive is a magnetic disk drive (commonly referred to as a "hard drive"). Alternatively, the invention could be used to test other data storage media, for example, optical data storage disks, or magneto-optical data storage disks. The methods of the invention can generally be run on any type of computer system having sufficient computing power to drive the particular I/O system being used.

Figure 1A:
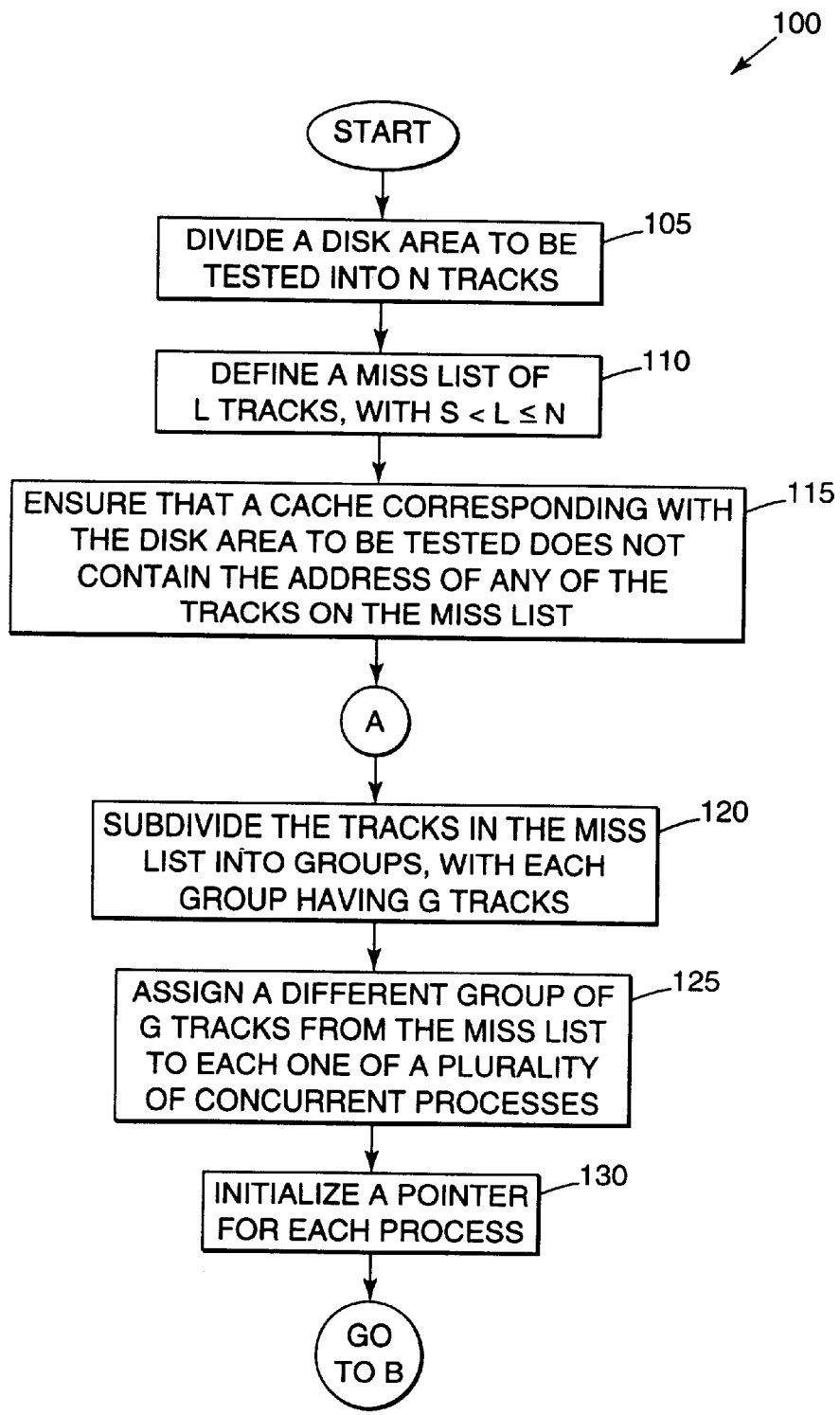
FIG. 1A is a first portion of a flow chart of a prior art method for producing a desired hit ratio in a benchmark test.
Figure 1B:
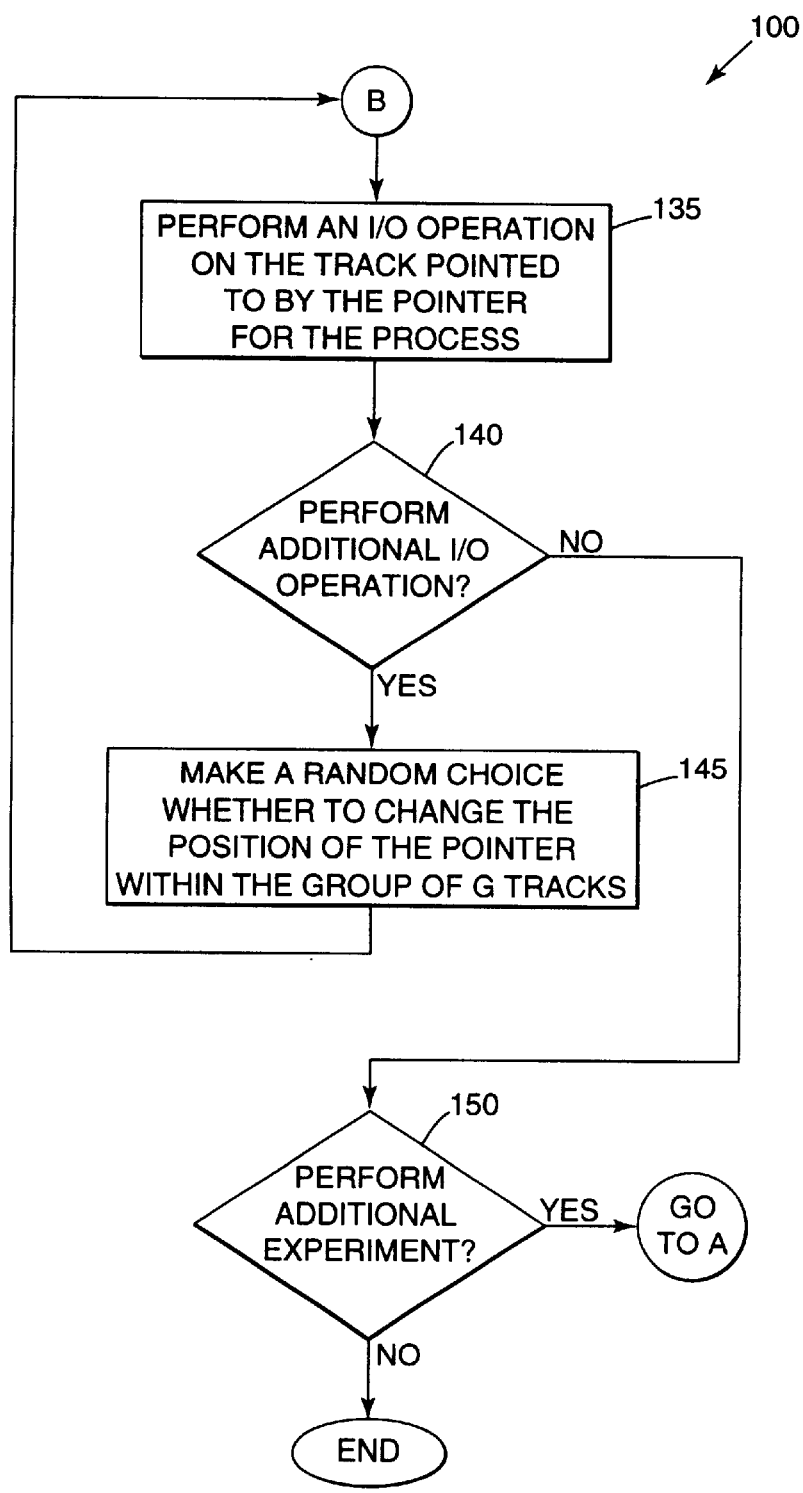
FIG. 1B is a second portion of the flow chart of a prior art method for producing a desired hit ratio in a benchmark test.
Figure 2:
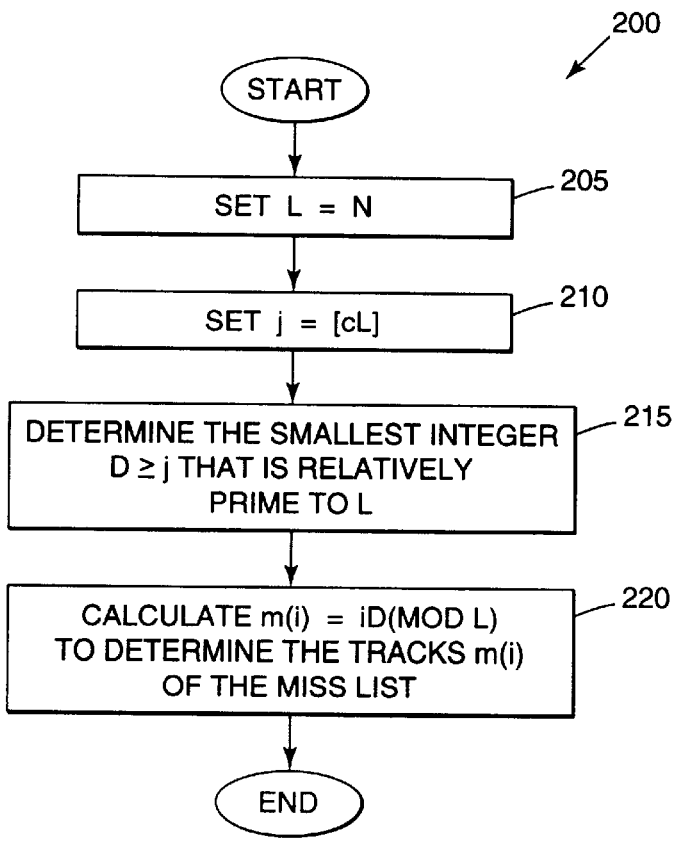
FIG. 2 is a flow chart of a prior art method for defining a miss list.

As described in the background section, in task 120 (FIG. 1A), the tracks in the miss list are subdivided into groups, with each group having G tracks. A modified equation is used for choosing G according to the method of the invention, in comparison with the equation used for choosing G in the method described in the background section. G is chosen according to the method of the invention such that:

$$(\text{safety factor one})(\text{maximum misses in any single benchmark run}) \leq GP \leq L/(\text{safety factor two}); \qquad (2)$$

where P is the number of concurrent processes. Safety factor two is included in equation (2) above, and is not included in equation (1) described in the background section. Safety factor two is included to ensure that a particular element of the miss list will be cycled out of the cache before any attempt to use the same element for a subsequent miss. Safety factor two can have any value greater than one, and preferably has a value of four. In addition to the value of 1.5 for safety factor one known in the prior art, in the method of the invention it is recognized that safety factor one can be greater than 1.5 or less than 1.5 (but must be greater than one).

As with the method for producing a desired hit ratio in a benchmark test described in the background section, if desired, in the method of the invention for defining a random miss list and producing a desired hit ratio in a benchmark test, the number of concurrent processes can be changed between benchmark runs. Either or both of the quantities P and G can be changed, and such a change need not be planned in advance (the new values can be based upon information gathered in previous runs). However, in the method of the invention, the new values of P and G must continue to satisfy equation (2) above.

As described in the background section, in task 130, a pointer for each process is initialized to point to the first track in the corresponding group of G tracks. As also described in the background section, for each process, in task 145 a random choice is made whether to change the position of the pointer by incrementing the pointer within the respective group of G tracks. The method of the invention recognizes that the pointer for each process need not be initialized to point to the first track in the corresponding group of G tracks, and can be initialized to point to any track in the corresponding group of G tracks. The method of the invention also recognizes that, for the group of G tracks corresponding with each process, incrementing the pointer is just one possible way to change the position of the pointer, and that alternatively, the position of the pointer can be changed by decrementing the pointer, or by modifying the pointer according to some other algorithm as long as the algorithm uses all of the G tracks belonging to the process. Thus, in the method of the invention, it is recognized that a miss is produced by changing the position of the pointer, which may be accomplished by incrementing the pointer (as in the prior art), decrementing the pointer, or modifying the pointer according to some other algorithm. Changing the position of the pointer can also be described as causing the pointer to point to a different track within the group of G tracks. For each process, the probability of changing the position of the pointer is set equal to the desired miss ratio.

In the preferred embodiment of the method of the invention for defining a random miss list and producing a desired hit ratio in a benchmark test, each pointer is initialized to the first track in the corresponding group of G tracks, and in the preferred embodiment, changing the position of a pointer is accomplished by incrementing the pointer.

Preferably, if the positions of pointers are to be changed by decrementing the pointers, the pointer for each process is initialized to point to the last track in the corresponding group of G tracks. In this case, i is decremented by subtracting one from its current value. If pointers are to be decremented, but are initialized to point to tracks other than the last track in each group of G tracks, then it could occur that a pointer pointing to the first track in a group of G tracks is to be decremented, in which case the pointer is decremented by causing the pointer to point to the last track in the respective group of G tracks. Similarly, if pointers are to be incremented, but are initialized to point to tracks other than the first track in each group of G tracks, then a pointer pointing to the last track in a group of G tracks is incremented by causing the pointer to point to the first track in the respective group of G tracks. When decrementing a pointer for which i equals zero, in which case i points to the first element of the miss list (and if this element is not also the first track in a group of G tracks as just described), then i is decremented by setting i equal to (L−1), so that i then points to the last element in the miss list. Similarly, when incrementing a pointer for which i equals (L−1), in which case i points to the last element in the miss list (and if this element is not also the last track in a group of G tracks as just described), then i is incremented by setting i equal to zero, so that i then points to the first element in the miss list.

Figure 3:
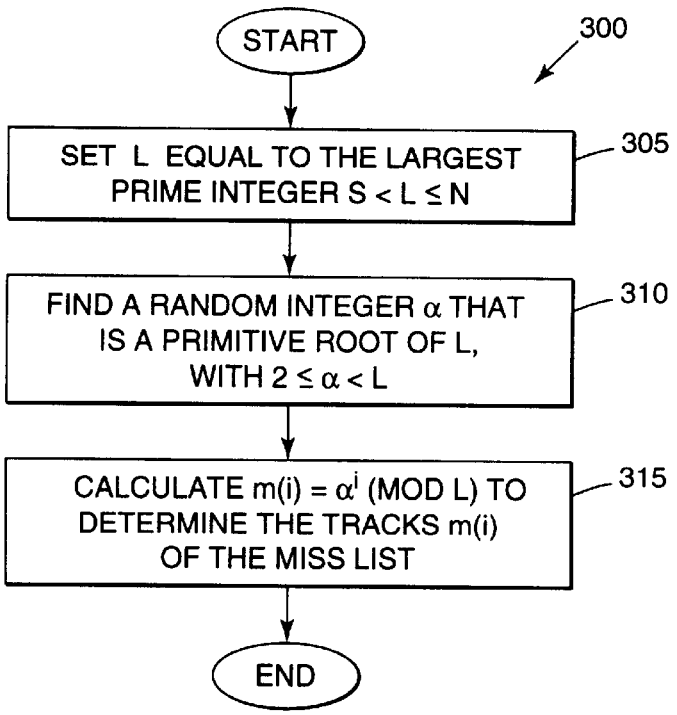
FIG. 3 is a flow chart of a method for defining a miss list in accordance with an illustrative embodiment of the invention.

An illustrative embodiment of the method of the invention for defining a miss list is shown by the tasks 300 of the flowchart in FIG. 3. The method of the invention for defining a miss list desirably produces a list of tracks for the miss list having more random addresses than prior art methods for producing a miss list. To define a miss list according to the method of the invention, for j=N, N−1, N−2, . . . , the first j that is a prime number, and that is also larger than S, is determined (which is the largest value of j that is a prime number). L is set equal to this value of j. These tasks are summarized in task 305. After the value of L is determined, one or more random integers, k, for $2 \leq k < L$, are tested to determine if k is a primitive root of L (k is a primitive root if there is no value $0 < m < (L-1)$ for which $k^m = 1 \pmod{L}$). Because the computations are done in modular arithmetic, it is possible to determine if k is a primitive root in a computationally efficient manner. A variable a is set equal to the first such k that is found. These tasks are summarized in task 310. After the value of a is ascertained, in task 315, the tracks m(i) of the miss list (for integers i, for $0 < i < L$) are calculated as follows: $m(i) = a^i \pmod{L}$.

Thus, for both the prior art method for defining a miss list described in the background section, and the method of the invention for defining a miss list, the miss list is defined implicitly, without requiring an array or other memory structure to enumerate the elements of the list. Using the implicit definition of the miss list, processes are able to efficiently compute the location of other tracks in a group of G tracks, such as track m(i+1) when incrementing the pointer, after having generated a previous request to track m(i).

The method of the invention for defining a miss list produces a more random miss list than prior methods, thereby producing better, more reliable, benchmark test results. The method of the invention for defining a random miss list and producing a desired hit ratio in a benchmark test produces a more random miss list than prior methods, and like the method for producing a desired hit ratio in a benchmark test described in the background section, when incorporated into a disk benchmark also allows the user to select any desired hit ratio, and provides the ability to produce the specified hit ratio accurately and repeatably, while running multiple concurrent processes that are accessing the same set of files, and even in the presence of varying or unknown amounts of cache.

Signal Bearing Medium

One or more of the methods of the invention may be implemented by operating a digital processing apparatus to execute a sequence of machine readable instructions. These instructions may reside in various types of signal-bearing media. In this respect, one aspect of the invention concerns one or more signal-bearing media tangibly embodying a program of machine-readable instructions executable by a digital processing apparatus to perform a method for defining a random miss list and producing a desired hit ratio in a benchmark test (or tests), and/or a method for defining a miss list for running a benchmark test (or tests) (which may or may not have a selectable hit ratio), according to the invention as described herein.

Figure 4:
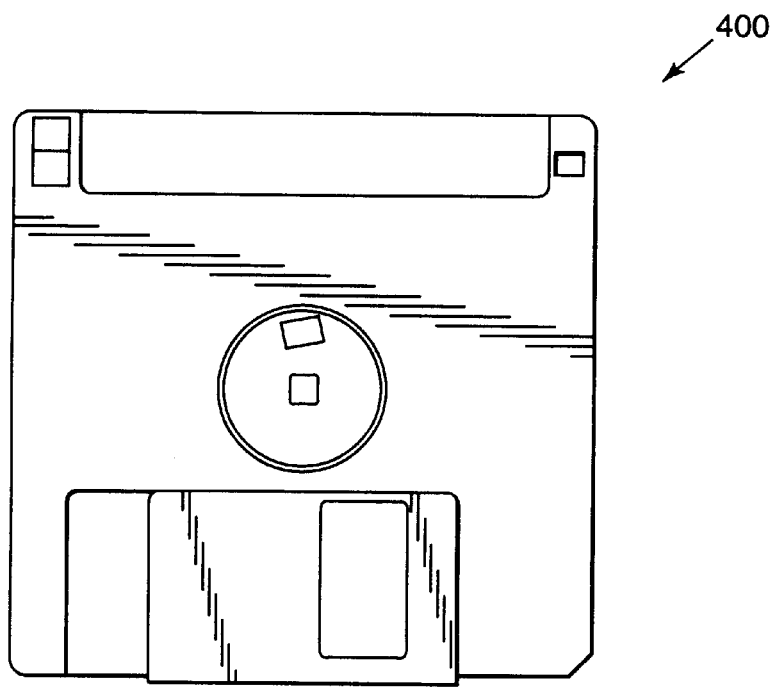
FIG. 4 shows an exemplary signal bearing medium in accordance with an illustrative embodiment of the invention.

The instructions may be contained, for example, in a signal-bearing medium such as a magnetic data storage diskette 400 shown in FIG. 4. Alternatively, instead of, or in addition to the magnetic data storage diskette, the signal bearing medium may include one or more of the following: random access memory (RAM), direct access storage device (DASD) storage (e.g., a conventional "hard drive" or a redundantary of inexpensive disks (RAID) array), magnetic tape, electronic read-only memory (e.g., read only memory (ROM) erasable programmable read only memory (EPROM) or EEPROM), an optical storage device (e.g. compact disk-read only memory (CD-ROM), write once read many (WORM), digital video disk (DVD), etc.), paper punch cards, or other suitable signal-bearing medium including transmission media such as digital and/or analog communication links. Preferably, the data storage medium is a hard drive in the computer system being used to conduct the benchmark test. In an illustrative embodiment of the invention, the machine-readable instructions may comprise software object code, compiled from a language such as C, C++, PLX, etc. Alternatively, the machine-readable instruction could include assembly language code.

In an alternative embodiment, the invention could be implemented partially or exclusively in hardware.

Apparatus

Figure 5:
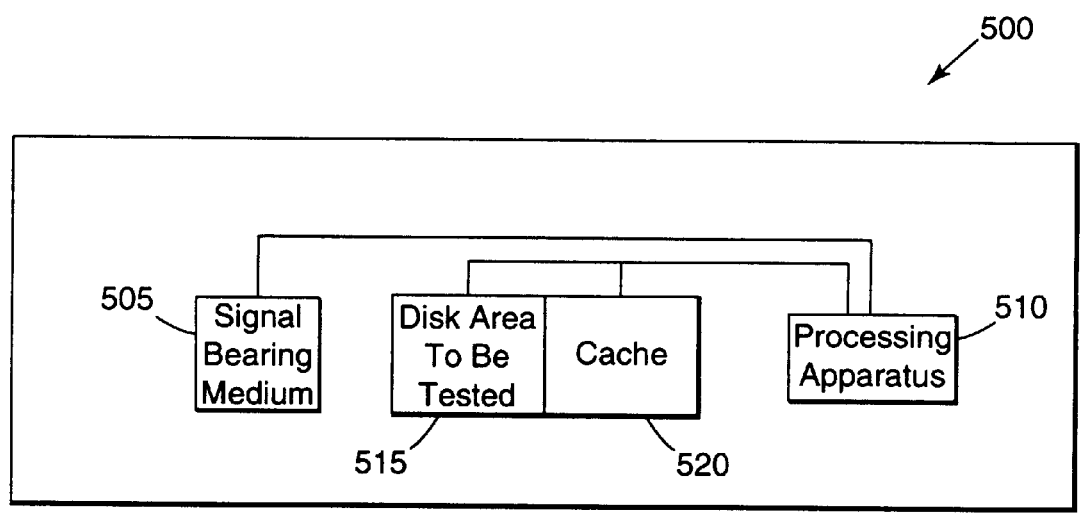
FIG. 5 is a block diagram of an apparatus for defining a random miss list and producing a desired hit ratio in a benchmark test.

As illustrated in FIG. 5, another aspect of the invention concerns an apparatus 500 for defining a random miss list and producing a desired hit ratio in a benchmark test, and/or for defining a miss list, according to the invention as described herein.

The apparatus includes a signal bearing medium 505 tangibly embodying a program of machine-readable instructions executable by a digital processing apparatus to perform a method for defining a random miss list and producing a desired hit ratio in a benchmark test (or tests), and/or for defining a miss list for running a benchmark test (or tests) (which may or may not have a selectable hit ratio), according to the invention as described herein. The signal bearing medium can be any of the signal bearing media described herein, and is preferably the hard drive of a computer being used to conduct the benchmark test.

The apparatus also includes a digital data processing apparatus 510 configured to execute the program(s) of machine-readable instructions embodied on the signal bearing medium. The digital processing apparatus can be a mainframe computer, for example an IBM OS/390®, an open system running UNIX® or AIX® such as an IBM RS6000®, a personal computer, a server, a microprocessor, a microcontroller, or any other type of digital data processing apparatus. Generally, any digital data processing apparatus with sufficient computing power can be used.

The signal bearing medium 505 is communicatively coupled to the digital data processing apparatus 510. The disk area to be tested 515 is communicatively coupled to an associated cache 520. Both the disk area to be tested and the cache are communicatively coupled to the digital data processing apparatus.

CONCLUSION

Illustrative embodiments of the invention, including what are presently considered to be the preferred embodiments of the invention, have been described herein. However, it will be apparent to those skilled in the art that various changes and modifications can be made without departing from the scope of the invention as defined by the appended claims. While illustrative embodiments of the invention have been discussed herein, it is not intended that the invention should be limited to only the embodiments discussed herein. Rather, the invention should be limited only by the scope of the claims.

What is claimed is:

1. A method for defining a random miss list and producing a desired hit ratio in a benchmark test, the method comprising:

dividing a disk area to be tested into N tracks;

setting L equal to the largest prime integer S<L<N, wherein S represents the maximum number of cacheable track images;

finding a random integer a that is a primitive root of L, with 2<a<L;

calculating $m(i)=a^i(\bmod L)$ to determine the L tracks m(i) of the miss list;

ensuring that a cache corresponding with the disk area to be tested does not contain the address of any of the tracks on the miss list;

subdividing the tracks in the miss list into groups, with each group having G tracks;

assigning a different group of G tracks from the miss list to each one of a plurality of concurrent processes;

initializing a pointer for each process to point to a track in the corresponding group of G tracks;

performing a plurality of I/O operations for each process, each I/O operation being performed on the track pointed to by the pointer for the corresponding process; and causing, as the result of a random choice for each process prior to each I/O operation after the first I/O operation, the position of the pointer within the respective group of G tracks to be changed, with the probability of changing the position of the pointer being equal to a first desired miss ratio.

2. The method of claim 1 wherein the track that each pointer is initialized to point to is the first track in the corresponding group of G tracks, and wherein each pointer whose position is caused to be changed is caused to be changed by incrementing the respective pointer.

3. The method of claim 1 wherein the track that each pointer is initialized to point to is the last track in the corresponding group of G tracks, and wherein each pointer whose position is caused to be changed is caused to be changed by decrementing the respective pointer.

4. The method of claim 1 further comprising performing an additional benchmark test by:

subdividing the tracks in the miss list into groups, with each group having G tracks;

assigning a different group of G tracks from the miss list to each one of a plurality of concurrent processes;

reinitializing a pointer for each process to point to a track in the corresponding group of G tracks;

performing a plurality of I/O operations for each process, each I/O operation being performed on the track pointed to by the pointer for the corresponding process; and causing, as the result of a random choice for each process prior to each I/O operation after the first I/O operation after reinitializing the pointer, the position of the pointer within the respective group of G tracks to be changed, with the probability of changing the position of the pointer being equal to a second desired miss ratio.

5. The method of claim 1 wherein G is chosen such that: (safety factor one)(maximum misses in any single benchmark run) GP L/safety factor two, where P is a number of concurrent processes.

6. The method of claim 5 wherein safety factor two equal four.

7. A method for defining a miss list for running a benchmark test, the method comprising:

setting L equal to the largest prime integer S<L<N, wherein N is the number of tracks of a storage medium;

finding a random integer a that is a primitive root of L, with 2<a<L; and determining a miss list according to $m(i)=a^i(\bmod L)$ wherein m(i) represents the tacks of the storage medium in the miss list.

8. A signal bearing medium tangibly embodying a program of machine-readable instructions executable by a digital processing apparatus, wherein the program when executed by the digital processing apparatus performs a method for defining a random miss list and producing a desired hit ratio in a benchmark test, the method comprising:

dividing a disk area to be tested into N tracks;
setting L equal to the largest prime integer S<L<N;
finding a random integer a that is a primitive root of L, with 2<a<L;
calculating $m(i)=a^i(\bmod L)$ to determine the L tracks m(i) of the miss list;
ensuring that a cache corresponding with the disk area to be tested does not contain the address of any of the tracks on the miss list;
subdividing the tracks in the miss list into groups, with each group having G tracks;
assigning a different group of G tracks from the miss list to each one of a plurality of concurrent processes;
initializing a pointer for each process to point to a track in the corresponding group of G tracks;
performing a plurality of I/O operations for each process, each I/O operation being performed on the track pointed to by the pointer for the corresponding process; and
causing, as the result of a random choice for each process prior to each I/O operation after the first I/O operation, the position of the pointer within the respective group of G tracks to be changed, with the probability of changing the position of the pointer being equal to a first desired miss ratio.

9. The signal bearing medium of claim 8 wherein the track that each pointer is initialized to point to is the first track in the corresponding group of G tracks, and wherein each pointer whose position is caused to be changed is caused to be changed by incrementing the respective pointer.

10. The signal bearing medium of claim 8 wherein the track that each pointer is initialized to point to is the last track in the corresponding group of G tracks, and wherein each pointer whose position is caused to be changed is caused to be changed by decrementing the respective pointer.

11. The signal bearing medium of claim 8 wherein G is chosen such that:

(safety factor one)(maximum misses in any single benchmark run)≦GP≦L/safety factor two.

12. The signal bearing medium of claim 11 wherein safety factor two equals four.

13. The signal bearing medium of claim 8, the method further comprising performing an additional benchmark test by:

subdividing the tracks in the miss list into groups, with each group having G tracks;
assigning a different group of G tracks from the miss list to each one of a plurality of concurrent processes;
reinitializing a pointer for each process to point to a track in the corresponding group of G tracks;
performing a plurality of I/O operations for each process, each I/O operation being performed on the track pointed to by the pointer for the corresponding process; and
causing, as the result of a random choice for each process prior to each I/O operation after the first I/O operation after reinitializing the pointer, the position of the pointer within the respective group of G tracks to be changed, with the probability of changing the position of the pointer being equal to a second desired miss ratio.

14. A signal bearing medium tangibly embodying a program of machine-readable instructions executable by a digital processing apparatus to perform a method for defining a miss list for running a benchmark test, the method comprising:

setting L equal to the largest prime integer S<L<N, wherein N is the number of tracks of a storage medium;
finding a random integer a that is a primitive root of L, with 2<a<L; and
determining a miss list according to $m(i)=a^i(\bmod L)$ wherein m(i) represents the tracks of the storage medium in the miss list.

15. An apparatus for defining a random miss list and producing a desired hit ratio in a benchmark test, comprising:

a signal bearing medium tangibly embodying a program of machine-readable instructions executable by a digital processing apparatus, wherein the program when executed by the digital processing apparatus performs a method for defining a random miss list and producing a desired hit ratio in a benchmark test; and
a digital processing apparatus configured to execute the program of machine readable instructions to
produce a desired hit ratio in a benchmark test, the method comprising: dividing a disk area to be tested into N tracks; setting L equal to the largest prime integer S<L<N; finding a random integer a that is a primitive root of L, with 2<a<L; calculating $m(i)=a^i(\bmod L)$ to determine the L tracks m(i) of the miss list;
ensure that a cache corresponding with the disk area to be tested does not contain the address of any of the tracks on the miss list;
subdivide the tracks in the miss list into groups, with each group having G tracks;
assign a different group of G tracks from the miss list to each one of a plurality of concurrent processes;
initialize a pointer for each process to point to a track in the corresponding group of G tracks;
perform a plurality of I/O operations for each process, each I/O operation being performed on the track pointed to by the pointer for the corresponding process; and
cause, as the result of a random choice for each process prior to each I/O operation after the first I/O operation, the position of the pointer within the respective group of G tracks to be changed, with the probability of changing the position of the pointer being equal to a first desired miss ratio.

16. The apparatus of claim 15 wherein the track that each pointer is initialized to point to is the first track in the corresponding group of G tracks, and wherein each pointer whose position is caused to be changed is caused to be changed by incrementing the respective pointer.

17. The apparatus of claim 15 wherein the track that each pointer is initialized to point to is the last track in the corresponding group of G tracks, and wherein each pointer whose position is caused to be changed is caused to be changed by decrementing the respective pointer.

18. The apparatus of claim 15, the method further comprising performing an additional benchmark test by:

subdividing the tracks in the miss list into groups, with each group having G tracks;
assigning a different group of G tracks from the miss list to each one of a plurality of concurrent processes;

reinitializing a pointer for each process to point to a track in the corresponding group of G tracks;

performing a plurality of I/O operations for each process, each I/O operation being performed on the track pointed to by the pointer for the corresponding process; and causing, as the result of a random choice for each process prior to each I/O operation after the first I/O operation after reinitializing the pointer, the position of the pointer within the respective group of G tracks to be changed, with the probability of changing the position of the pointer being equal to a second desired miss ratio.

19. The apparatus of claim 15 wherein G is chosen such that:

(safety factor one)(maximum misses in any single benchmark run)$\leq$GP$\leq$L/safety factor two.

20. The apparatus of claim 19 wherein safety factor two equals four.

21. An apparatus for defining a miss list for running a benchmark test, comprising:

a signal bearing medium tangibly embodying a program of machine-readable instructions executable by a digital processing apparatus, wherein the program when executed by the digital processing apparatus performs a method for defining a miss list for running a benchmark test with a selectable hit ratio; and a digital processing apparatus configured to execute the program of machine-readable instructions to perform the method for defining a miss list for running a benchmark test with a selectable hit ratio, the method comprising:

setting L equal to the largest prime integer S<L<N, wherein N is the number of tracks of a storage medium;

finding a random integer a that is a primitive root of L, with 2<a<L; and determining a miss list according to $m(i)=a^i(\mod L)$ wherein m(i) represents the tacks of the storage medium in the miss list.

* * * * *